United States Patent
Parrino et al.

(10) Patent No.: US 11,479,072 B2
(45) Date of Patent: Oct. 25, 2022

(54) TOP MOUNT WITH INTEGRATED JOUNCE DAMPER

(71) Applicant: GM GLOBAL TECHNOLOGY OPERATIONS LLC, Detroit, MI (US)

(72) Inventors: Daniel J. Parrino, Oak Park, MI (US); Andrew S. Rogers, Macomb, MI (US); Scott B. Janson, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 255 days.

(21) Appl. No.: 17/036,920

(22) Filed: Sep. 29, 2020

(65) Prior Publication Data

US 2022/0097470 A1 Mar. 31, 2022

(51) Int. Cl.
| | |
|---|---|
| *B60G 13/08* | (2006.01) |
| *B60G 13/00* | (2006.01) |
| *B60G 13/10* | (2006.01) |
| *B60G 13/18* | (2006.01) |
| *B60G 11/27* | (2006.01) |

(52) U.S. Cl.
CPC .............. *B60G 13/08* (2013.01); *B60G 11/27* (2013.01); *B60G 13/003* (2013.01); *B60G 13/10* (2013.01); *B60G 13/18* (2013.01); *B60G 2202/1522* (2013.01); *B60G 2202/242* (2013.01)

(58) Field of Classification Search
CPC ...... B60G 11/27; B60G 13/003; B60G 13/18; B60G 13/10; B60G 2202/242; B60G 2202/1522; B60G 2204/128; B60G 15/067; F16F 9/585; F16F 7/09; F16F 9/446

USPC .................................................... 280/124.159
See application file for complete search history.

(56) References Cited

U.S. PATENT DOCUMENTS

| | | | | |
|---|---|---|---|---|
| 9,186,948 | B2* | 11/2015 | Patil | B60G 11/22 |
| 9,193,241 | B2* | 11/2015 | Suchta | B60G 15/067 |
| 10,434,835 | B2* | 10/2019 | Six | F15B 13/027 |
| 11,009,096 | B2* | 5/2021 | Lamoureux | F16F 9/3405 |
| 2015/0321533 | A1* | 11/2015 | Laird | B62K 25/28 |
| | | | | 280/124.16 |
| 2018/0194186 | A1* | 7/2018 | Anderson | F16F 9/585 |

(Continued)

FOREIGN PATENT DOCUMENTS

WO  WO-2015012946 A1 *  1/2015 ........... B60G 15/063

*Primary Examiner* — Paul N Dickson
*Assistant Examiner* — Caitlin Anne Miller
(74) *Attorney, Agent, or Firm* — Quinn IP Law

(57) ABSTRACT

A vehicle suspension system includes a damper top mount including a top mount body defining an interior cavity, a damper coupled to the top mount and including a damping member and a damper rod coupled to the damping member, and a jounce shock assembly including a jounce shock body coupled with the damper top mount and encircling the top mount body. The jounce shock body includes an exterior wall and a dividing wall generally parallel to and interior of the exterior wall, a first chamber defined by the top mount body and the dividing wall, a second chamber fluidly coupled with and parallel to the first chamber and defined by the dividing wall and the exterior wall, a floating piston movably disposed within the second chamber, and a piston configured to translate within the first chamber between an extended position and a compressed position.

20 Claims, 5 Drawing Sheets

(56) References Cited

U.S. PATENT DOCUMENTS

| | | | |
|---|---|---|---|
| 2021/0140508 A1* | 5/2021 | Sintorn | F16F 9/063 |
| 2022/0169088 A1* | 6/2022 | Hwang | B60G 17/005 |

* cited by examiner

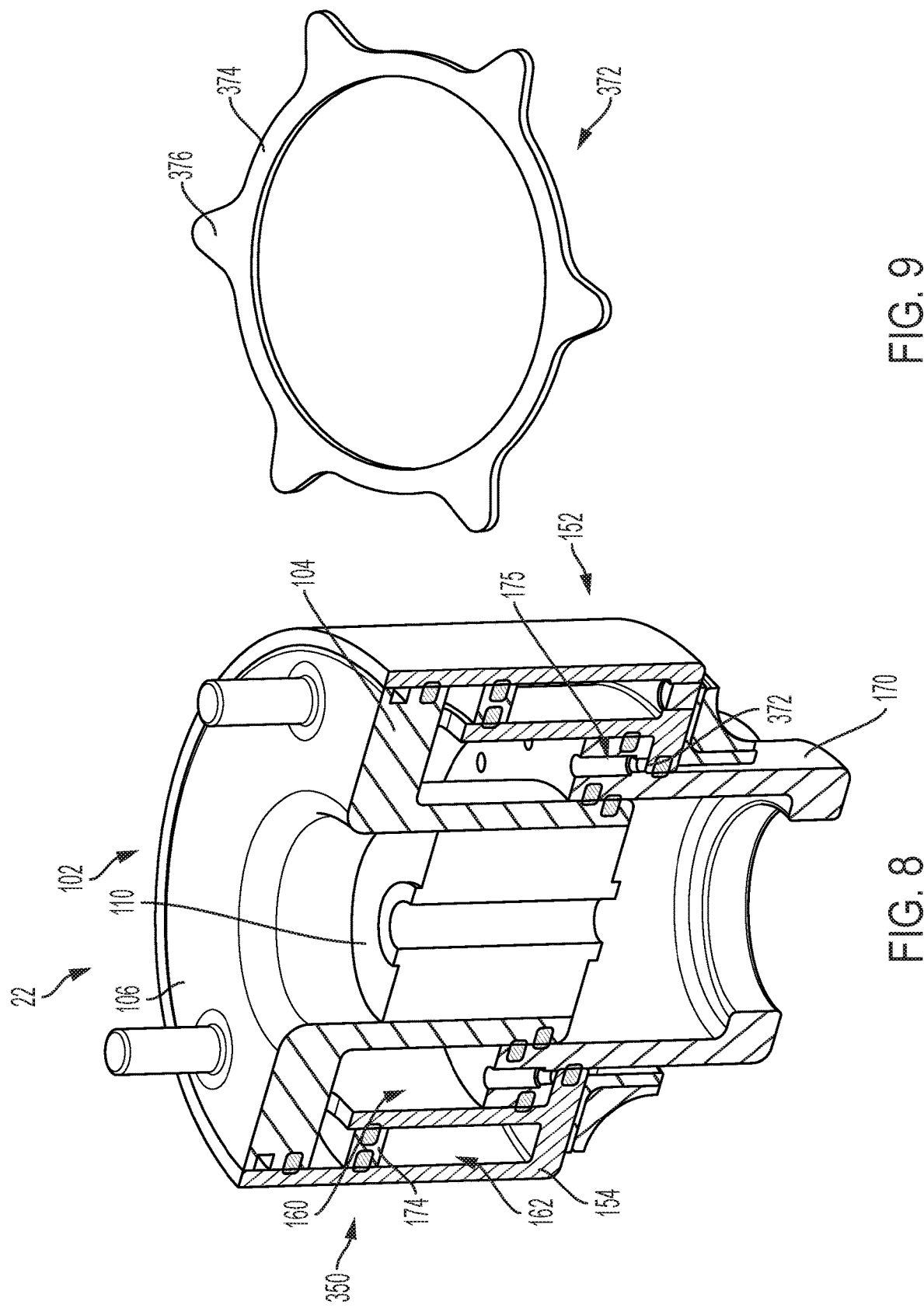

TOP MOUNT WITH INTEGRATED JOUNCE DAMPER

The present disclosure relates generally to automotive suspension systems including a jounce damper integrated with a top mount.

Vehicles are typically equipped with suspension systems that include components that contract and expand to provide flexible relative movement between the body and chassis. During normal driving conditions, these components gradually dissipate the forces generated by bumps, potholes, and other road surface anomalies in a controlled manner that helps the driver to maintain control over the vehicle and provides passengers a comfortable driving environment.

It is desirable to provide an energy mitigation device, such as a jounce damper or shock, to reduce the peak suspension loads transmitted to a vehicle body structure. Furthermore, packaging constraints within the suspension system have typically resulted in additional structure to attach a jounce damper to the vehicle frame or body structure. The packaging constraints result in position of the jounce damper in a suboptimal location resulting in poor motion ratio and higher loads.

SUMMARY

Embodiments according to the present disclosure provide a number of advantages. For example, embodiments according to the present disclosure enable inclusion of the jounce damper into the vehicle top mount. The top mount with integrated jounce damper drives loads in an existing dedicated load path and needs less structure for attachment to the vehicle frame or body structure. Throughout this application, the terms "jounce damper" and "jounce shock" are used interchangeably.

In one aspect of the present disclosure, a vehicle suspension system includes a damper top mount including a flange coupled to a cylindrical top mount body defining an interior cavity and a top mount bushing disposed in the interior cavity. The vehicle suspension system also includes a damper coupled to the top mount. The damper includes a damping member and a damper rod coupled to the damping member, the damper rod extending through the interior cavity of the damper top mount and defining a first axis. The vehicle suspension system also includes a jounce shock assembly including a cylindrical jounce shock body coupled with the damper top mount and encircling the cylindrical top mount body. The cylindrical jounce shock body includes an exterior wall and a dividing wall generally parallel to and interior of the exterior wall, a first chamber defined by the cylindrical top mount body and the dividing wall, a second chamber fluidly coupled with and parallel to the first chamber and defined by the dividing wall and the exterior wall, a floating piston movably disposed within the second chamber, and a piston including a working surface configured to translate within the first chamber. The piston is coupled with the damping member such that the piston moves between an extended position and a compressed position along the first axis defined by the damper rod.

In some aspects, in the extended position, the first chamber of the jounce shock body is generally filled with oil, the second chamber of the jounce shock body is generally filled with compressed air, and the floating piston separates the oil from the compressed air.

In some aspects, the vehicle suspension system further includes a check valve coupled with the piston and configured to translate within the first chamber, wherein the check valve extends through an opening in the piston.

In some aspects, the check valve closes as the piston moves between the compressed position and the extended position to control a rate of fluid transfer within the first chamber to slow a rate of movement of the piston.

In some aspects, the jounce shock assembly includes a plurality of check valves arranged around the circumference of the piston and disposed within the first chamber.

In some aspects, the working surface of the piston translates within the first chamber such that a volume of the first chamber when the piston is in the extended position is greater than a volume of the first chamber when the piston is in the compressed position.

In some aspects, in the extended position, the first chamber of the jounce shock body is generally filled with oil and the second chamber of the jounce shock body is generally filled with a compression member coupled to the floating piston.

In some aspects, the compression member is a compression spring.

In some aspects, the vehicle suspension system further includes a deflection member disposed in the first chamber and configured to control a rate of fluid transfer within the first chamber to slow a rate of movement of the piston.

In some aspects, the dividing wall includes a first opening connecting the first chamber and the second chamber and configured to allow a flow of fluid between the first and second chambers.

In another aspect of the present disclosure, an automotive vehicle includes a vehicle frame and a vehicle suspension system coupled to the vehicle frame. The vehicle suspension system includes a damper top mount coupled to the vehicle frame, the damper top mount including a flange coupled to a cylindrical top mount body defining an interior cavity and a top mount bushing disposed in the interior cavity. The vehicle suspension system also includes a damper coupled to the top mount, the damper including a damping member and a damper rod coupled to the damping member, the damper rod extending through the interior cavity of the damper top mount and defining a first axis and a jounce shock assembly. The jounce shock assembly includes a cylindrical jounce shock body coupled with the damper top mount and encircling the cylindrical top mount body, the cylindrical jounce shock body including an exterior wall and a dividing wall generally parallel to and interior of the exterior wall. A first chamber is defined by the cylindrical top mount body and the dividing wall and a second chamber is fluidly coupled with and parallel to the first chamber and defined by the dividing wall and the exterior wall. A floating piston is movably disposed within the second chamber. The vehicle suspension system also includes a piston including a working surface configured to translate within the first chamber. The piston is coupled with the damping member such that the piston moves between an extended position and a compressed position along the first axis defined by the damper rod.

In some aspects, when the piston is in the extended position, the first chamber of the jounce shock body is generally filled with oil, the second chamber of the jounce shock body is generally filled with compressed air, and the floating piston separates the oil from the compressed air.

In some aspects, the vehicle suspension system further includes a check valve coupled with the piston and configured to translate within the first chamber.

In some aspects, the check valve closes as the piston moves between the compressed position and the extended position to control a rate of fluid transfer within the first chamber to slow a rate of movement of the piston.

In some aspects, the jounce shock assembly includes a plurality of check valves arranged around the circumference of the piston and disposed within the first chamber.

In some aspects, the working surface of the piston translates within the first chamber such that a volume of the first chamber when the piston is in the extended position is greater than a volume of the first chamber when the piston is in the compressed position.

In some aspects, when the piston is in the extended position, the first chamber of the jounce shock body is generally filled with oil, the second chamber of the jounce shock body is generally filled with a compression member coupled to the floating piston.

In some aspects, the vehicle suspension system further includes a deflection member disposed in the first chamber and configured to control a rate of fluid transfer within the first chamber to slow a rate of movement of the piston.

In some aspects, the dividing wall includes a first opening connecting the first chamber and the second chamber and configured to allow a flow of fluid between the first and second chambers.

In another aspect of the present disclosure, a damper module includes a damper top mount including a flange coupled to a cylindrical top mount body defining an interior cavity and a damper coupled to the top mount. The damper includes a damping member and a damper rod coupled to the damping member, the damper rod extending through the interior cavity of the damper top mount and defining a first axis. The damper module also includes a jounce shock assembly. The jounce shock assembly includes a cylindrical jounce shock body coupled with the damper top mount and encircling the cylindrical top mount body, the cylindrical jounce shock body including an exterior wall and a dividing wall generally parallel to and interior of the exterior wall. A first chamber is defined by the cylindrical top mount body and the dividing wall and a second chamber is fluidly coupled with and parallel to the first chamber and defined by the dividing wall and the exterior wall. A floating piston is movably disposed within the second chamber. The damper module also includes a piston including a working surface configured to translate within the first chamber, and a check valve coupled with the piston and configured to translate within the first chamber. The piston is coupled with the damping member such that the piston moves between an extended position and a compressed position along the first axis defined by the damper rod.

BRIEF DESCRIPTION OF THE DRAWINGS

The present disclosure will be described in conjunction with the following figures, wherein like numerals denote like elements.

FIG. 8 is a schematic perspective cross-sectional view of a jounce shock assembly integrated with a damper top mount, shown in an extended position, according to another embodiment.

FIG. 9 is a schematic perspective view of a deflection member used with the jounce shock assembly of FIG. 8, according to an embodiment.

Figure 1:
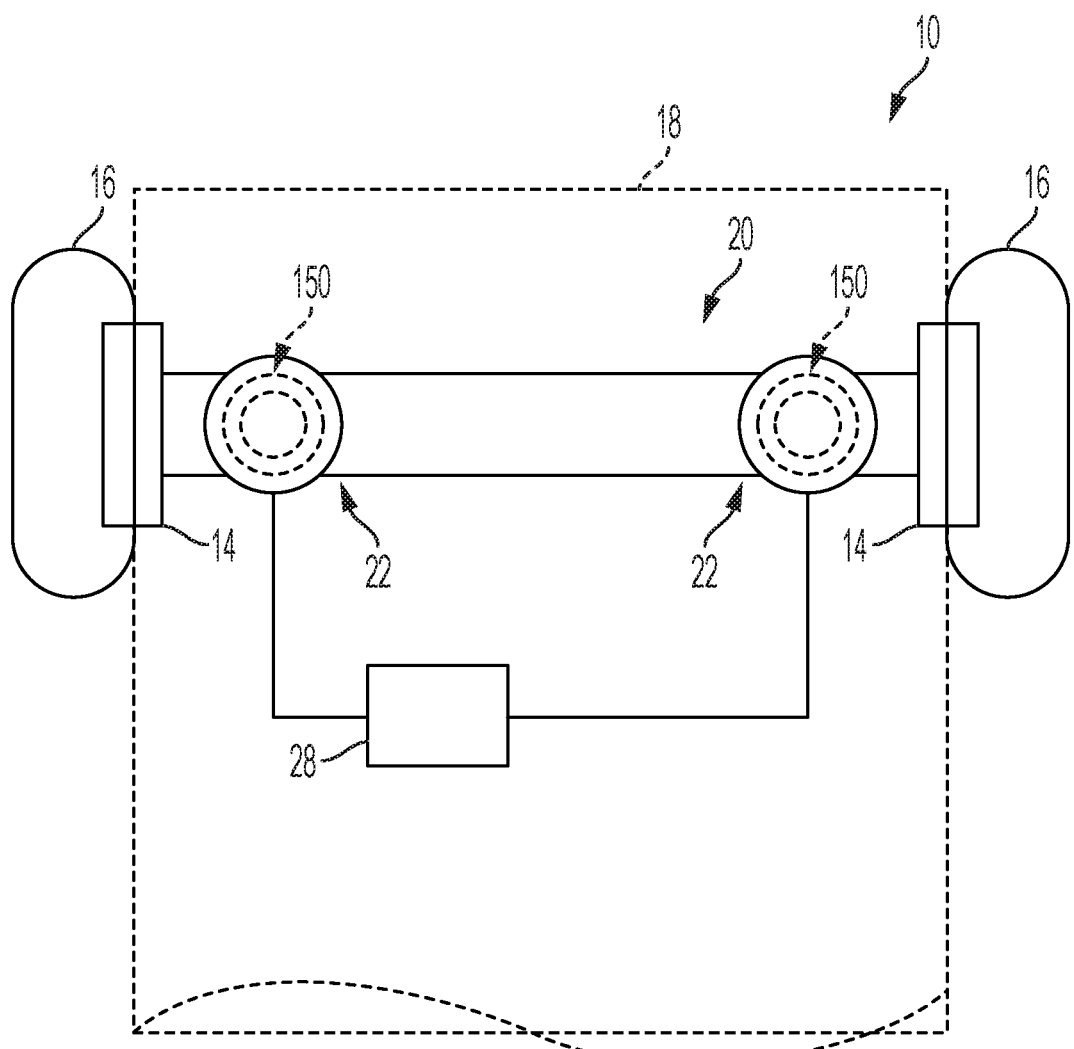
FIG. 1 is a functional block diagram illustrating a vehicle that includes a damper having a jounce shock, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof and words of similar import.

With reference to FIG. 1, a vehicle 10 is shown including a damper with a jounce shock in accordance with various embodiments. Although the figures shown herein depict an example with certain arrangements of elements, additional intervening elements, devices, features, or components may be present in an actual embodiment. It should also be understood that FIG. 1 is merely illustrative and may not be drawn to scale.

The vehicle 10 is shown to include wheels 14, each fitted with a tire 16. The wheels 14 are supported by a vehicle frame 18 via a suspension system shown generally at 20. The suspension system 20 generally includes damper modules 22. Although the suspension system 20 is shown to be associated with only two wheels 14 for ease of description (e.g., either front wheels or rear wheels), it is appreciated that the suspension system 20 of the present disclosure is also applicable to a single wheel 14, any pair of wheels 14 or all of the wheels 14 (plus others not shown) of the vehicle 10. As will be discussed in greater detail herein, the damper modules 22 can include a jounce shock assembly 150, which can provide energy dissipation and reduction in peak forces experienced by the vehicle frame 18 during an impact event. In various embodiments, the vehicle frame 18 includes any type of frame used to support the other components of the vehicle 10 including a traditional vehicle frame as well as a unibody cradle construction, for example and without limitation.

In one example, the vehicle 10 can also include a control module 28, which can be in communication with a portion of the suspension system 20 to control the activation of a portion of the suspension system 20. For example, the control module 28 can be in communication with one or more of the damper modules 22 to activate the damper modules 22 in response to one or more sensed conditions associated with the vehicle 10. Thus, the vehicle 10 can include one or more sensors that can detect and measure observable conditions of the suspension system 20 and/or vehicle 10 and generate sensor signals based on the observable conditions. Accordingly, the damper modules 22 can actively respond to road surface conditions in real time based on signals received from the control module 28. In alternative embodiments, the damper modules 22 can also respond passively to road conditions.

Figure 3:
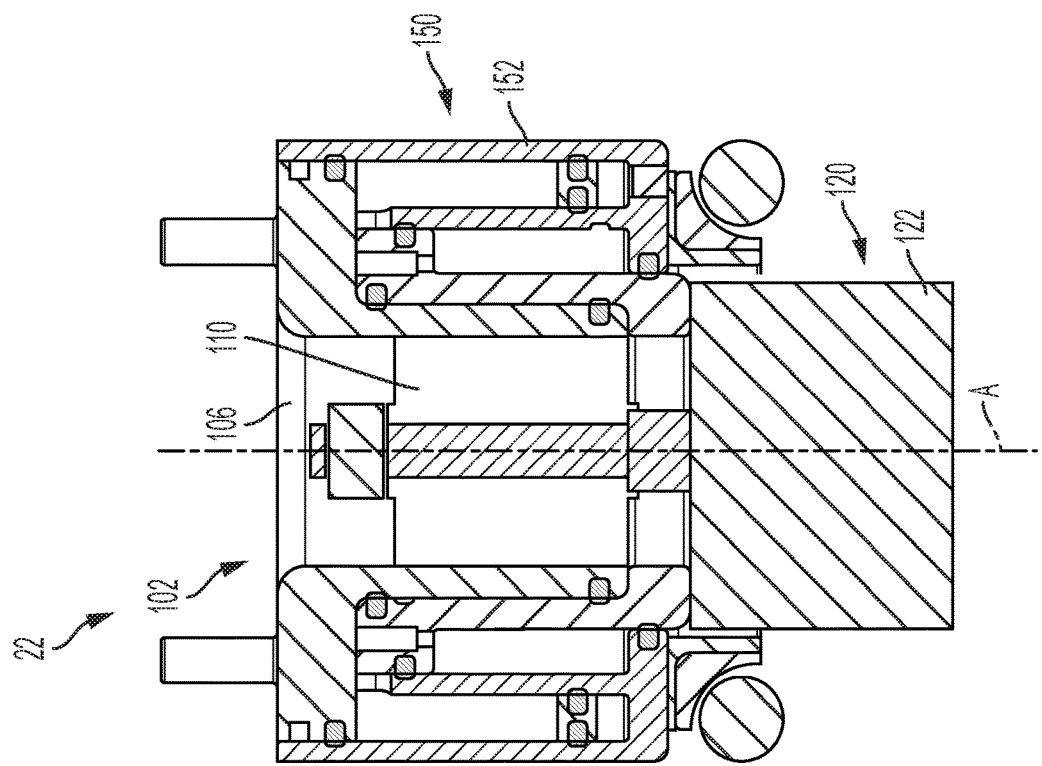
FIG. 3 is a schematic cross-sectional view of the damper module of FIG. 2 in a compressed position, according to an embodiment.
Figure 2:
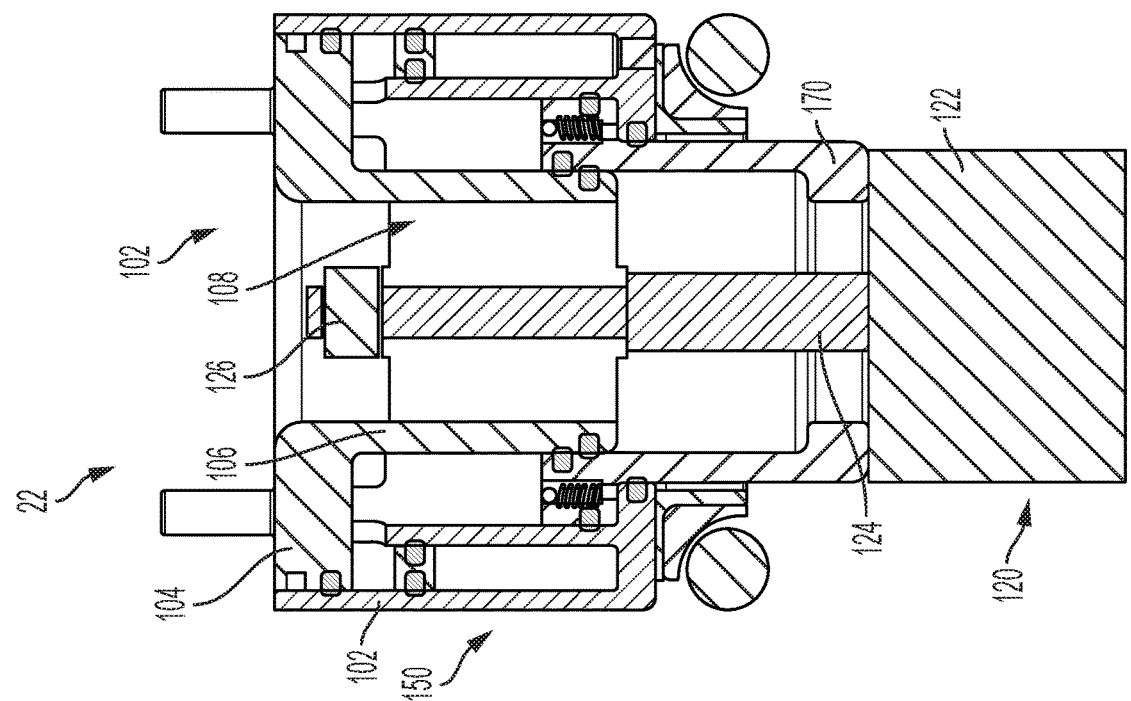
FIG. 2 is a schematic cross-sectional view of a damper module including a jounce shock, shown in an extended position, according to an embodiment.

With reference to FIGS. 2 and 3, the suspension system 20 includes a damper top mount 102. The damper top mount 102 includes a flange 104 coupled to a cylindrical top mount body 106. The cylindrical top mount body 106 defines an interior cavity 108. A top mount bushing 110 is disposed within the interior cavity 108. The damper top mount 102 is couplable to a vehicle frame, such as the vehicle frame 18 shown in FIG. 1.

A damper 120 is coupled to the damper top mount 102. The damper 120 includes a damping member 122 and a damper rod 124 coupled to the damping member 122. The damper rod 124 extends through the interior cavity 108 and is coupled with the damper top mount 102 with a damper rod nut 126. The damper rod 124 defines a first axis A.

Figures 4, 5:
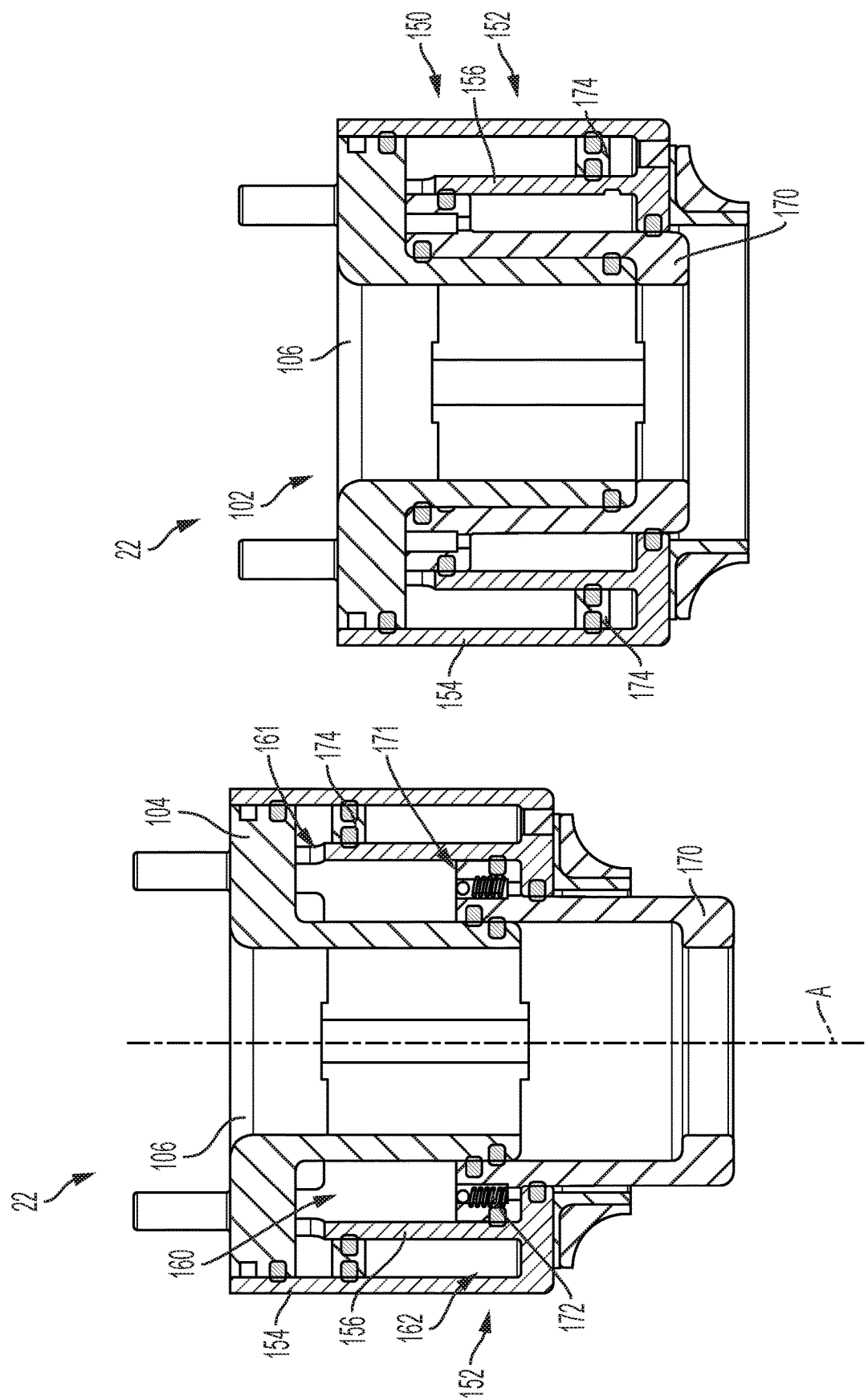
FIG. 4 is a schematic cross-sectional view of a jounce shock assembly integrated with a damper top mount, shown in an extended position, according to an embodiment.
FIG. 5 is a schematic cross-sectional view of the jounce shock assembly of FIG. 4, shown in a compressed position, according to an embodiment.

With continued reference to FIGS. 2 and 3, and with reference to FIGS. 4 and 5, the suspension system 20 also includes a jounce shock assembly 150. The jounce shock assembly 150 includes a cylindrical jounce shock body 152 coupled with the flange 104 of the damper top mount 102. The jounce shock body 152 encircles or encloses the cylindrical top mount body 106. The jounce shock body 152 includes an exterior wall 154 surrounding an interior dividing wall 156. The dividing wall 156 is generally parallel to and interior of the exterior wall 154. The dividing wall 156 separates a first chamber 160 from a second chamber 162 of the jounce shock assembly 150. The first chamber 160 is defined by the top mount body 106 and the dividing wall 156. The second chamber 162 is defined by the dividing wall 156 and the exterior wall 154 of the jounce shock body 152. The second chamber 162 is generally parallel to the first chamber 160. Each of the first and second chambers 160, 162 extends generally parallel to the first axis A. An opening 161 extends through the dividing wall 156 to allow a flow of fluid between the first and second chambers 160, 162 in response to an impact event.

The jounce shock assembly 150 further includes a movable piston 170. As shown in FIGS. 2 and 3, the piston 170 is coupled with the damping member 122. The piston 170 and the damping member 122 react to an impact event by translating along the first axis A between an extended position (shown in FIG. 2) and a compressed position (shown in FIG. 3). The piston 170 includes a working surface 171. The working surface 171 translates within the first chamber 160 as the piston 170 and damping member 122 move between the extended position and the compressed position. The working surface 171 acts on the fluid within the first chamber 160. As the piston 170 moves from the extended position to the compressed position, the working surface 171 translates upward and reduces a volume of the first chamber 160, acting on the fluid within the first chamber 160 to push the fluid from the first chamber 160 to the second chamber 162 via the opening 161. The working surface 171 of the piston 170 translates within the first chamber 160 such that the volume of the first chamber 160 when the piston 170 is in the extended position is greater than the volume of the first chamber 160 when the piston 170 is in the compressed position.

In various embodiments, as shown in FIGS. 4 and 5, the jounce shock assembly 150 also includes a check valve 172. The check valve 172 is coupled with the piston 170 and is configured to translate within the first chamber 160. The check valve 172 extends through the piston 170 to regulate a flow of the first working fluid within the first chamber 160. The check valve 172 closes as the piston 170 moves between the compressed position (shown in FIG. 5) and the extended position (shown in FIG. 4) to control a rate of fluid transfer within the first chamber 160 and to slow the rate of movement of the piston 170. The efficiency of the illustrated embodiment results in a lower reaction force of the integrated damper module 22 and jounce shock assembly 150 to control the response of the suspension of the vehicle 10 to the impact event. In various embodiments, the jounce shock assembly 150 includes a plurality of check valves 172 arranged around the circumference of the piston 170 and disposed within the first chamber 160.

The jounce shock assembly 150 also includes a floating piston 174 movably disposed within the second chamber 162. In various embodiments, the floating piston 174 separates a first working fluid (disposed primarily in the first chamber 160) from a second working fluid (disposed in the second chamber 162). As the piston 170 moves from the extended position to the compressed position, the first working fluid acts on the floating piston 174 to move the floating piston 174 downward within the second chamber 162. The combination of movement of the piston 170 and the floating piston 174 with the working fluids of the first and second chambers 160, 162 are well-known shock absorption technologies. However, the parallel arrangement of the first and second chambers 160, 162 and the inclusion of the jounce shock assembly 150 within the damper top mount 102 enables efficient packaging of the suspension components within the damper module 22. The embodiment shown in FIGS. 2-5 also drives loads from impact events into an existing, dedicated load path as the jounce shock assembly 150 is in line with the damper 120 rather than mounted at another location on the vehicle frame 18. Additionally, the illustrated embodiment requires less additional structure for attachment to the vehicle frame 18. Positioning the jounce shock assembly 150 in line with the damper module 22 creates an improved motion ratio relative to a frame- or body-mounted jounce shock assembly 150, resulting in lower loads with a similar dynamic benefit.

Figure 7:
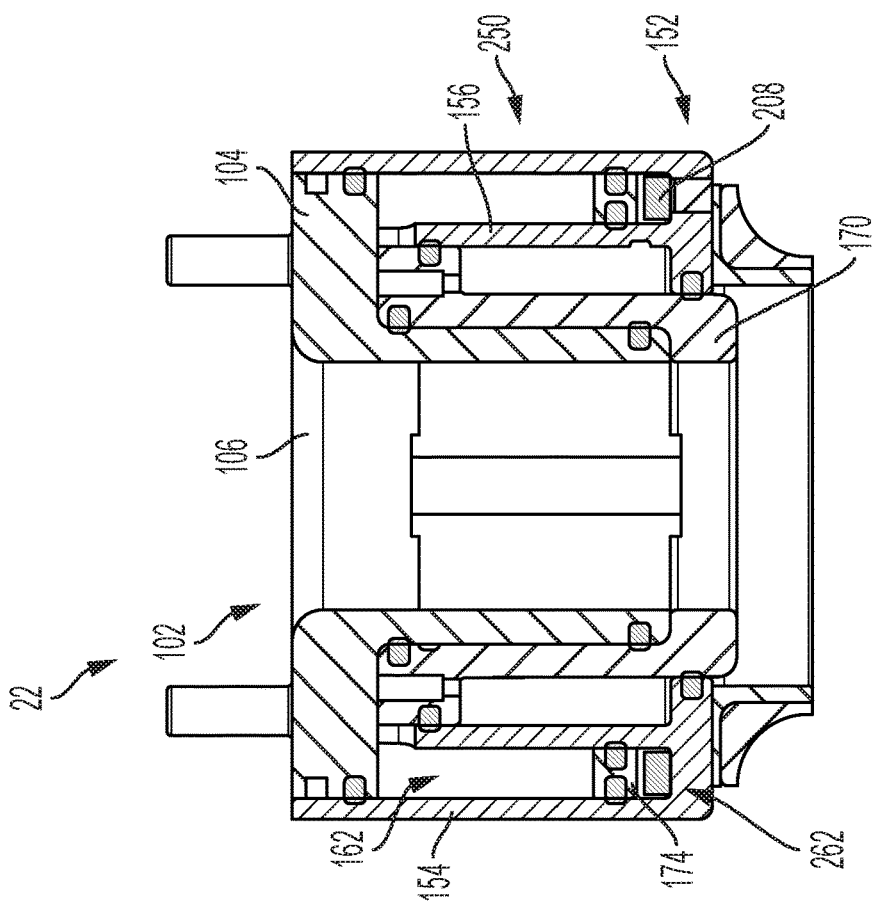
FIG. 7 is a schematic cross-sectional view of the jounce shock assembly of FIG. 6, shown in a compressed position, according to an embodiment.
Figure 6:
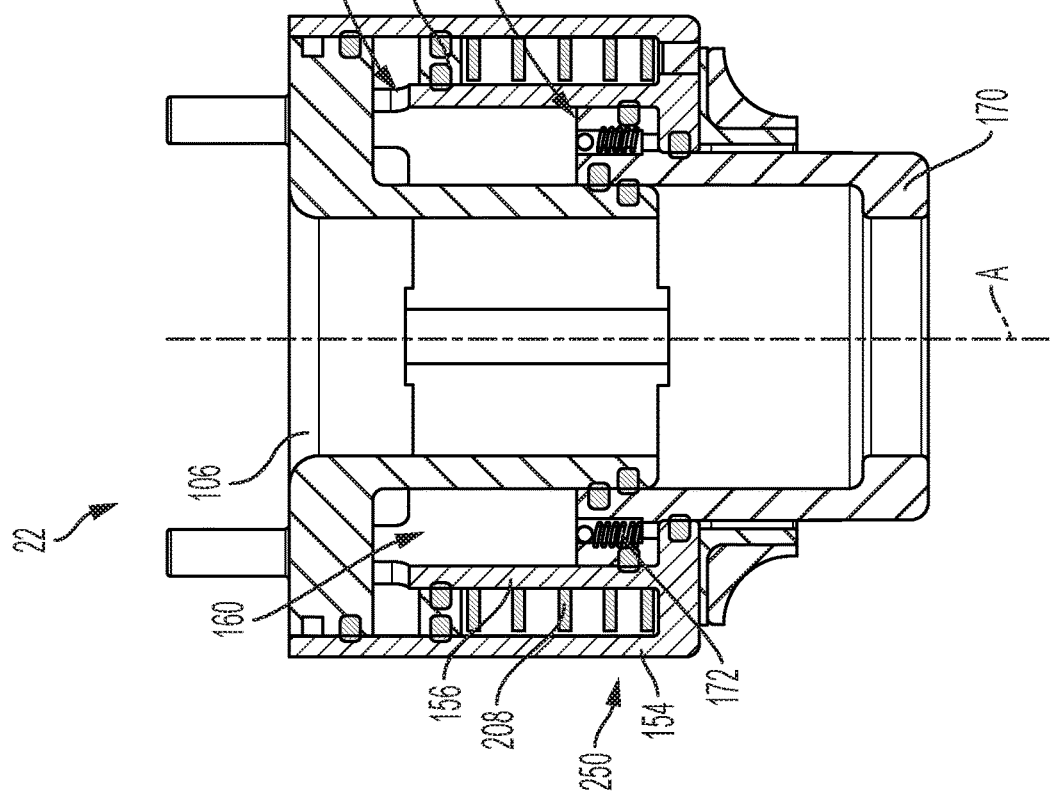
FIG. 6 is a schematic cross-sectional view of a jounce shock assembly integrated with a damper top mount, shown in an extended position, according to another embodiment.

Another embodiment of a jounce shock assembly 250 incorporated into the damper module 22 is shown in FIGS. 6 and 7. With like reference numbers corresponding to like or similar components, the jounce shock assembly 250 includes the cylindrical jounce shock body 152 coupled with the flange 104 of the damper top mount 102. The jounce shock body 152 encircles or encloses the cylindrical top mount body 106. The jounce shock body 152 includes the exterior wall 154 surrounding the interior dividing wall 156. The dividing wall 156 is generally parallel to and interior of the exterior wall 154. The dividing wall 156 separates the first chamber 160 from the second chamber 162 of the jounce shock assembly 250. The second chamber 162 is generally parallel to the first chamber 160. Each of the first and second chambers 160, 162 extends generally parallel to the first axis A. The opening 161 extends through the dividing wall 156 to allow a flow of fluid between the first and second chambers 160, 162 in response to an impact event.

The jounce shock assembly 250 further includes the movable piston 170, as discussed herein with reference to FIGS. 2 and 3. The working surface 171 of the piston 170 acts on the fluid within the first chamber 160. As the piston 170 moves from the extended position to the compressed position, the working surface 171 translates upward and reduces a volume of the first chamber 160, acting on the fluid within the first chamber 160 to push the fluid from the first chamber 160 to the second chamber 162 via the opening 161.

The jounce shock assembly 250 also includes the floating piston 174 movably disposed within the second chamber 162. In various embodiments, the floating piston 174 separates the first working fluid (disposed primarily in the first chamber 160) from a compression member 208 (disposed in the second chamber 162). In various embodiments, the compression member 208 is a compression spring. In various embodiments, the compression member 208 is coupled with the floating piston 174 and with a terminal end 262 of the second chamber 162. As the piston 170 moves from the extended position to the compressed position, the first working fluid acts on the floating piston 174 to move the floating piston 174 downward within the second chamber 162, against the compression force of the compression member 208.

Another embodiment of a jounce shock assembly 350 is shown in FIG. 8. With like reference numbers corresponding to like or similar components, the jounce shock assembly 350 includes a deflection member 372 disposed in the first chamber 160. The deflection member 372, illustrated in FIG. 9, includes a generally cylindrical body 374. A plurality of deflection elements 376 extend outward from the cylindrical body 374 and correspond to locations of openings 175 that extend through the piston 170. The deflection element 376 is configured to control a rate of fluid transfer within the first chamber 160 to slow a rate of movement of the piston 170. The deflection element 376 closes the opening 175 as the piston 170 moves between the compressed position and the extended position (shown in FIG. 8) to control a rate of fluid transfer within the first chamber 160 and to slow the rate of movement of the piston 170.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form addition& embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context dearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives and is not intended to limit the selection to only those listed alternatives or to only one of the listed alternatives at a time unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle suspension system, comprising:
a damper top mount including a flange coupled to a cylindrical top mount body defining an interior cavity;
a top mount bushing disposed in the interior cavity;
a damper coupled to the top mount, the damper including a damping member and a damper rod coupled to the damping member, the damper rod extending through the interior cavity of the damper top mount and defining a first axis; and
a jounce shock assembly including a cylindrical jounce shock body coupled with the damper top mount and encircling the cylindrical top mount body, the cylindrical jounce shock body including an exterior wall and a dividing wall generally parallel to and interior of the exterior wall, a first chamber defined by the cylindrical top mount body and the dividing wall, a second chamber fluidly coupled with and parallel to the first chamber and defined by the dividing wall and the exterior wall, a floating piston movably disposed within the second chamber, and a piston including a working surface configured to translate within the first chamber;
wherein the piston is coupled with the damping member such that the piston moves between an extended position and a compressed position along the first axis defined by the damper rod.

2. The vehicle suspension system of claim 1, wherein in the extended position, the first chamber of the cylindrical jounce shock body is generally filled with oil, the second chamber of the cylindrical jounce shock body is generally filled with compressed air, and the floating piston separates the oil from the compressed air.

3. The vehicle suspension system of claim 1 further comprising a check valve coupled with the piston and configured to translate within the first chamber, wherein the check valve extends through an opening in the piston.

4. The vehicle suspension system of claim 3, wherein the check valve closes as the piston moves between the compressed position and the extended position to control a rate of fluid transfer within the first chamber to slow a rate of movement of the piston.

5. The vehicle suspension system of claim 3, wherein the jounce shock assembly comprises a plurality of check valves arranged around a circumference of the piston and disposed within the first chamber.

6. The vehicle suspension system of claim 1, wherein the working surface of the piston translates within the first chamber such that a volume of the first chamber when the piston is in the extended position is greater than a volume of the first chamber when the piston is in the compressed position.

7. The vehicle suspension system of claim 1, wherein in the extended position, the first chamber of the cylindrical jounce shock body is generally filled with oil and the second chamber of the cylindrical jounce shock body is generally filled with a compression member coupled to the floating piston.

8. The vehicle suspension system of claim 7, wherein the compression member is a compression spring.

9. The vehicle suspension system of claim 1 further comprising a deflection member disposed in the first chamber and configured to control a rate of fluid transfer within the first chamber to slow a rate of movement of the piston.

10. The vehicle suspension system of claim 1, wherein the dividing wall includes a first opening connecting the first chamber and the second chamber and configured to allow a flow of fluid between the first and second chambers.

11. An automotive vehicle, comprising:
a vehicle frame; and
a vehicle suspension system coupled to the vehicle frame, the vehicle suspension system comprising:
a damper top mount coupled to the vehicle frame, the damper top mount including a flange coupled to a cylindrical top mount body defining an interior cavity;
a top mount bushing disposed in the interior cavity;
a damper coupled to the top mount, the damper including a damping member and a damper rod coupled to the damping member, the damper rod extending through the interior cavity of the damper top mount and defining a first axis; and
a jounce shock assembly including a cylindrical jounce shock body coupled with the damper top mount and encircling the cylindrical top mount body, the cylindrical jounce shock body including an exterior wall and a dividing wall generally parallel to and interior of the exterior wall, a first chamber defined by the cylindrical top mount body and the dividing wall, a second chamber fluidly coupled with and parallel to the first chamber and defined by the dividing wall and the exterior wall, a floating piston movably disposed within the second chamber, and a piston including a working surface configured to translate within the first chamber;
wherein the piston is coupled with the damping member such that the piston moves between an extended position and a compressed position along the first axis defined by the damper rod.

12. The automotive vehicle of claim 11, wherein when the piston is in the extended position, the first chamber of the cylindrical jounce shock body is generally filled with oil, the second chamber of the cylindrical jounce shock body is generally filled with compressed air, and the floating piston separates the oil from the compressed air.

13. The automotive vehicle of claim 11, wherein the vehicle suspension system further comprises a check valve coupled with the piston and configured to translate within the first chamber.

14. The automotive vehicle of claim 13, wherein the check valve closes as the piston moves between the compressed position and the extended position to control a rate of fluid transfer within the first chamber to slow a rate of movement of the piston.

15. The automotive vehicle of claim 13, wherein the jounce shock assembly comprises a plurality of check valves arranged around a circumference of the piston and disposed within the first chamber.

16. The automotive vehicle of claim 11, wherein the working surface of the piston translates within the first chamber such that a volume of the first chamber when the piston is in the extended position is greater than a volume of the first chamber when the piston is in the compressed position.

17. The automotive vehicle of claim 11, wherein when the piston is in the extended position, the first chamber of the cylindrical jounce shock body is generally filled with oil, the second chamber of the cylindrical jounce shock body is generally filled with a compression member coupled to the floating piston.

18. The automotive vehicle of claim 11, wherein the vehicle suspension system further comprises a deflection member disposed in the first chamber and configured to control a rate of fluid transfer within the first chamber to slow a rate of movement of the piston.

19. The automotive vehicle of claim 11, wherein the dividing wall includes a first opening connecting the first chamber and the second chamber and configured to allow a flow of fluid between the first and second chambers.

20. A damper module, comprising:
a damper top mount including a flange coupled to a cylindrical top mount body defining an interior cavity;
a damper coupled to the top mount, the damper including a damping member and a damper rod coupled to the damping member, the damper rod extending through the interior cavity of the damper top mount and defining a first axis; and
a jounce shock assembly including a cylindrical jounce shock body coupled with the damper top mount and encircling the cylindrical top mount body, the cylindrical jounce shock body including an exterior wall and a dividing wall generally parallel to and interior of the exterior wall, a first chamber defined by the cylindrical top mount body and the dividing wall, a second chamber fluidly coupled with and parallel to the first chamber and defined by the dividing wall and the exterior wall, a floating piston movably disposed within the second chamber, a piston including a working surface configured to translate within the first chamber, and a check valve coupled with the piston and configured to translate within the first chamber;
wherein the piston is coupled with the damping member such that the piston moves between an extended position and a compressed position along the first axis defined by the damper rod.

* * * * *